United States Patent

[11] 3,628,485

| [72] | Inventors | John D. Gill<br>2209 Segovia Circle, Coral Gables, Fla. 33134;<br>James R. Wynne, Miami, Fla. 33137 |
|---|---|---|
| [21] | Appl. No. | 860,589 |
| [22] | Filed | Sept. 24, 1969 |
| [45] | Patented | Dec. 21, 1971 |

[54] PLANING BOAT WITH STEPPED HULL
14 Claims, 9 Drawing Figs.

| [52] | U.S. Cl. | 114/66.5 P |
|---|---|---|
| [51] | Int. Cl. | B63b 1/22 |
| [50] | Field of Search | 114/66.5 P, 66.5 S |

[56] References Cited
UNITED STATES PATENTS

| 1,413,383 | 4/1922 | Besson | 114/66.5 P |
|---|---|---|---|
| 3,399,643 | 9/1968 | Bennett | 114/66.5 P |

*Primary Examiner*—Andrew H. Farrell
*Attorneys*—George H. Baldwin and Arthur G. Yeager ABSTRACT: A planing boat having a step near the stern, with the bottom aft of the step normally out of water. The boat is provided with one or more trim flaps attached along their forward edges to the portion of the hull bottom which is forward of and adjacent the step, with the flaps extending aft of the step. A control member for adjusting each flap extends upwardly from the upper surface of the flap through the hull bottom portion which is aft of the step. One or more rudder shafts extend through the hull bottom aft of the flaps and carry rudders with the relatively thick upper portions of the rudders where they join the rudder shafts disposed at a level generally above the level of the after or trailing edges of the flap or flaps. One or more propeller shaft struts may be connected to the after hull bottom portion with the relatively thick upper mounting portions of the struts under the hull bottom being generally above the level of the after edges of the flaps.

PATENTED DEC 21 1971 3,628,485

INVENTORS
James R. Wynne
John D. Gill
BY George H. Baldwin
ATTORNEY

PLANING BOAT WITH STEPPED HULL

An object of the invention is to provide a bottom arrangement for a planing boat characterized by minimal drag from rudders and shaft struts and by conveniently operated trim flaps disposed in a protected position under the hull and forward of the stern.

This invention pertains to planing boats and particularly to inboard engine powered high-speed motor boats. The hull of this invention is characterized in that it has a transverse step. The step divides the hull bottom into a forward portion, which supports all or substantially all of the weight of the boat at planing speeds, and an after portion, which is completely or substantially completely out of water at planing speeds, although parts of the after portion may, of course, contact solid water aft of the step during turns or when operating in rough water. At low speeds or when at rest, much or all of the after portion will normally be below the water line. The portion of the hull bottom which is aft of the step extends not more than small fraction of the boat length forward of the transom, preferably approximately one-twentieth of such length. The hull preferably is a V hull aft having a dead rise angle aft of at least about 4°, or it may have a greater dead rise angle up to and including angles characteristic of so-called "deep V" hulls with a dead rise angle, from keel to chine, of between about 20° and 30°.

While certain of the advantages of the invention may be obtained even though flaps be omitted, according to the preferred embodiment trim flaps are provided which constitute an extension of the planing surface rearwardly of the step. The step preferably extends laterally from the after end of each chine, where the chine meets the lower corner of the transom, diagonally forwardly to meet the keel, or hull centerline, a short distance forwardly of the transom, and thus the step preferably comprises two sections meeting at the keel and extending diagonally outwardly and aftwardly therefrom to form an obtuse V-angle in plan view. Each step section, i.e. the section to port of the keel and the section to starboard thereof, is preferably provided with a respective flap. Certain advantages of the invention may be obtained, however, with step and flaps located near the stern but which extend laterally at right angles to the centerline of the hull.

Figure 1:
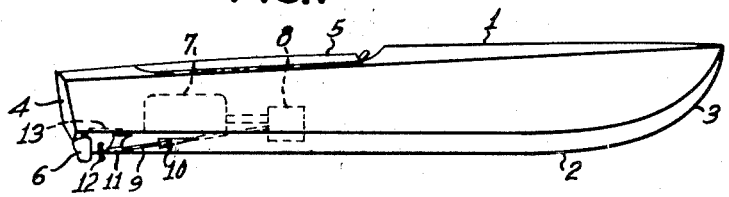
FIG. 1 is a side elevation of a planing power boat embodying the invention.

Referring to FIG. 1 of the drawings, the boat 1 is seen to comprise a V-bottom hull 2 with a bow 3, a stern transom 4, a cockpit 5, rudder 6, inboard engine 7, V-drive gear box 8, and a propeller shaft 9 extending from the gear box through a stuffing box 10, supported by a strut 11 and carrying a propeller 12. A step and flap arrangement, indicated generally at 13, is provided as better seen in other figures. The engine, gear box, and portions of arrangement 13 are shown in broken lines in FIG. 1. While only one rudder, and one drive train and propeller are shown in FIG. 1, it will be understood that the vessel is twin screw, with port and starboard engines, propellers and drive trains, and rudders.

Figure 4:
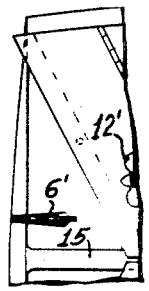
FIG. 4 is a fragmentary bottom view of a portion of the boat similar to FIG. 3 showing an alternate positional relationship of propeller and rudder.
Figure 2:
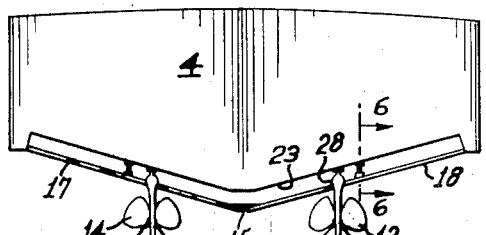
FIG. 2 is a rear elevation of the stern of the boat of FIG. 1 on an enlarged scale.
Figure 3:
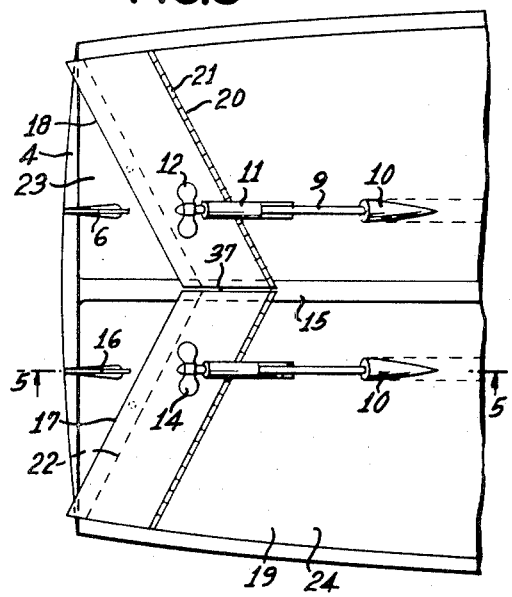
FIG. 3 is a bottom view of the boat with a forward part thereof omitted.
Figure 5:
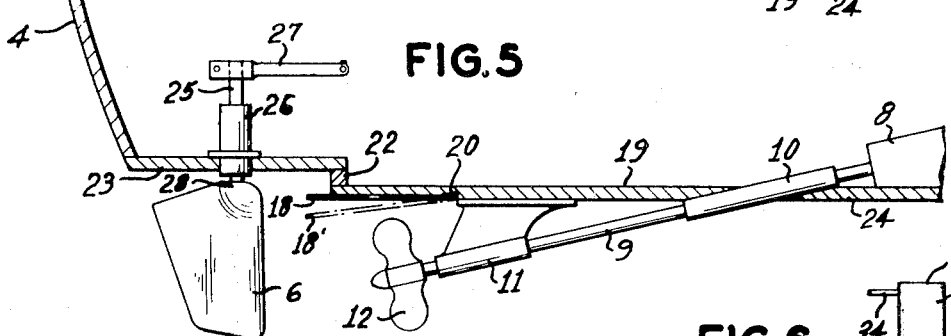
FIG. 5 is a sectional side view taken generally along line 5—5 of FIG. 3 on a further enlarged scale.

As seen in FIGS. 2, 3 and 5, the propellers 12 and 14 are disposed on opposite sides of the central keel 15 of the hull, the starboard propeller 12 being preferably arranged for rotation in a direction opposite to that of the port propeller 14 to minimize lateral propeller reaction effects. The propellers are connected to their respective shafts, with the shafts passing through the hull in stuffing boxes, shaft 9 being shown as passing through stuffing box 10. The shafts are supported by appropriate struts, such as strut 11 for shaft 9, and, in the embodiment shown in these figures, the rudders are disposed directly behind their respective propellers, the starboard rudder 6 being shown as directly behind propeller 12, while the port rudder 16 is shown as directly behind propeller 14. Such positioning of the rudders enhances rudder effectiveness, but somewhat less total drag may result, if maximum speed is desired, by slightly offsetting the rudders from alignment with the respective propellers, and, as seen in FIG. 4, starboard rudder 6' is so offset toward keel 15 inwardly from the propeller 12' and is thus not aligned directly behind the propeller. The port rudder would, of course, be similarly arranged.

Referring again particularly to FIGS. 2, 3, and 5 of the drawings, a pair of trim flaps, or a single flap divided at the centerline of the boat into two flap sections, including a port flap, or port flap section, 17 and a starboard flap, or starboard flap section, 18 are arranged under the hull. The forward edges of the flap or flaps are hingedly joined to the bottom 19 of the hull, by means of hinges, such as hinge 20 connecting the forward edge 21 of flap or flap section 18 to the hull. A step 22 extends across the hull bottom above the flaps 17 and 18, and there is defined aftwardly of the step an after hull bottom portion 23 which is out of water during planing operation of the boat. The boat planes on the major forward bottom portion 24, which is forward of the flaps, and further planes on the surfaces of the flaps 17 and 18. It will be understood that these conditions exist during movement of the boat at planing speeds straight ahead in calm water, but that in rough seas, or during sharp turns, parts of the raised bottom portion 23 may be temporarily contacted by solid water. Moreover, even in straight ahead planing operation, spray will wet the surface of the portion 23. At rest, or at low speeds, portion 23 will, at least in part, be underwater.

The rudders 6 and 16 are mounted in the manner shown in FIG. 5 for rudder 6, that is by means of a rudder shaft or stock 25, extending through a rudder tube 26, the shaft terminating upwardly inside the hull in suitable rudder control means 27. The lower end of the rudder shaft is attached to the rudder itself which is disposed below the section 23 of the hull. The tube 26 in which rudder shaft 25 rotates may extend slightly below the lower surface of the hull portion 23, and the rudders, as seen for rudder 6, include thickened upper end portions, as seen at 28, where the rudder is connected to its respective rudder shaft.

Figure 6:
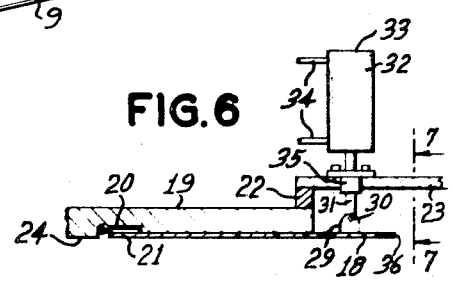
FIG. 6 is a fragmentary sectional detail view taken along line 6—6 of FIG. 2 on a further enlarged scale.
Figure 7:
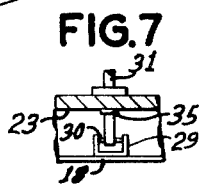
FIG. 7 is a fragmentary sectional detail view taken along line 7—7 of FIG. 6.

The flaps are provided with control means as best understood from the detailed sectional views of FIGS. 6 and 7. As there shown, flap 18, hingedly mounted by hinge 20 to hull bottom portion 24, is provided with attachment means in the form of a bracket 29 affixed to the upper surface of the flap and a pin 30 carried by the bracket. The bracket and pin connect the flap to reciprocating control shaft 31 of power shaft actuator means 32. The means 32 is shown as comprising a hydraulic cylinder 33 and suitable hydraulic fluid supply means 34 so arranged as to permit operation from within the boat of the flap position by extension and retraction of the shaft or rod 31. The shaft 31 is seen to pass through the portion 23 of the hull bottom and to be there provided with a suitable stuffing box 35. The operator within the boat may, accordingly, by means 32, swing the flap from its solid line position shown in FIG. 5 to its broken-line position 18', the flap swinging, of course, on the axis of hinge 20.

It is to be noted that the flaps are so disposed with respect to step 22 as to have their tailing edges, such as edge 36 of flap 18, located rearwardly of the step but not extending beyond the stern of the boat, and having the leading edge 21 connected to and in alignment with the forward planing surface 24 of the hull bottom. This arrangement permits the convenient location of the control elements 29, 30 and 31 for the flaps in a position in which they offer no drag as the boat moves through the water at planing speeds, yet requiring no special cuplike indentations into the hull bottom to house the portions of the controls, such as elements 29 and 30, which are above the flaps, thereby eliminating the awkward, expensive and unsightly upward projections of such cuplike portion which would otherwise be required in the hull. This arrangement further eliminates any flap actuator, flap or rudder apparatus from a vulnerable and unsightly position externally of the transom.

The preferred step configuration and disposition, as best shown in FIG. 3, is in the form of a shallow V in plan view, with the step intersecting the keel 15, or the centerline of the boat, at a point 37 spaced somewhat forwardly of the transom 4 and extending outwardly and rearwardly from such point to substantially the intersection between the transom and the respective chine of the boat. The leading and trailing edges of each flap are, preferably, substantially parallel to the respective portion of the step which lies above the respective flap. Since the rudders and flaps do not project beyond, or, at least, not appreciably beyond, the stern of the boat, they are not unsightly nor subject to damage.

Figure 8:
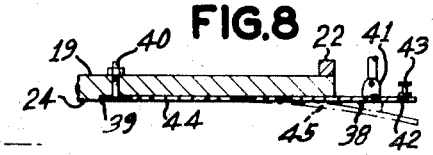
FIG. 8 is a fragmentary sectional view similar to FIG. 6 but showing details of an alternate flap arrangement.

A modified trim flap arrangement is shown in FIG. 8 wherein the flap 38 is fixedly attached adjacent its forward edge 39, such as by means of bolts 40, to the portion 24 of hull bottom structure 19. The flap in accord with this arrangement may be of thin flexible fiberglass or metal, and it is provided with suitable control linkage elements as shown at 41, corresponding to elements 29, 30, 31, 32, 33 and 34 as described in connection with FIGS. 6 and 7, and it may be further provided above its trailing edge portion 42 with an overlying reenforcing member or rib 43, which may extend from end to end of the flap to reduce warping thereof, as may be found desirable or necessary. According to this flap embodiment, the forward portion, generally indicated at 44, constitutes a hinge for the rearward portion 42 whereby the flap may be hinged or deflected downwardly into the position shown in broken lines 45 by operation of the control means 41.

Figure 9:
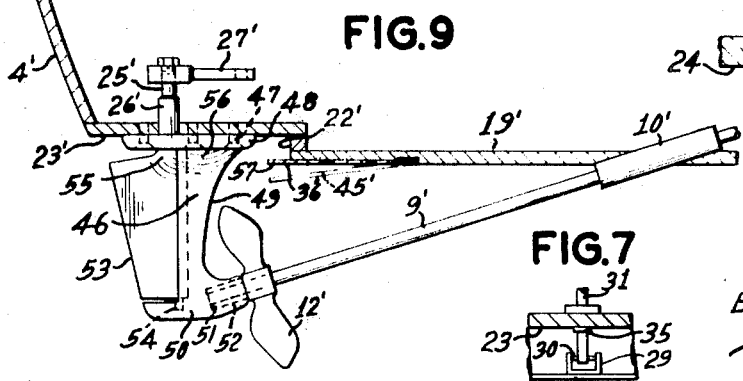
FIG. 9 is a sectional view similar to FIG. 5 showing a modified arrangement of rudder, propeller, propeller shaft strut, and step and embodying the alternate flap arrangement of FIG. 8.

A modified construction in accord with the invention is shown in FIG. 9. The descriptions hereinabove set forth which are applicable to the elements of the arrangement of FIG. 9 are identified by corresponding numbers on the drawing, to which, however prime symbols have been added.

The arrangement as shown in FIG. 9 comprises a propeller shaft 9' extending through hull bottom structure 19' through stuffing box 10' and carrying propeller 12'. The hull is provided with a flexible resilient trim flap 36' which, as described in connection with FIG. 8, may be deflected, by means of the controls as heretofore described, into the broken-line position 45'.

Tiller or rudder control member 27' is connected inside the hull to rudder shaft 25', and the shaft passes through after bottom portion 23' and stuffing box or tube 26'.

The stuffing box or tube 26' forms a part of the structure 46 which is bolted by bolts such as bolt 47 to the afterhull portion 23'. The structure includes an upper plate 48 underlying the bottom portion 23' and disposed behind step 22' at a level slightly above the level of the trim flap 36'. Extending downwardly from the plate or flange portion 48 is a strut portion 49 which carries within its enlarged lower end portion 50 an internal bearing 51 in which is disposed a journal 52, which may comprise a portion of the propeller shaft extending aft of the propeller, and which is rigid with and coaxial with the shaft and bearing. The strut portion 49 of the structure 46 shields and fairs into the leading edge of the rudder 53, and the lower end portion 50 of the structure preferably includes an internal bearing 54 for a downwardly projecting journal from the lower forward end of the rudder 53. The upper end portion of the rudder 53 at 55 is somewhat enlarged at its point of attachment to the rudder shaft 25', and it will be understood that the strut portion 49 increases generally in size at its upper end portion 56 where it joins the plate portion 48 of the structure. The arrangement is such that the enlarged upper portions 55, of the rudder 53, and 56, of the strut portion 49, together with the relatively large and bulky plate portion 48 of the structure are at least partially, and preferably substantially completely, above the level of the trailing edge 57 of the trim flap when it is adjusted to provide proper trim for the boat while in high-speed planing conditions whereby the plate 48 and the enlarged portions 55 and 56 are not, during planing, in solid water but are out of water in the air space underlying after hull bottom portion 23', air space which, as previously suggested, may have more or less spray entering thereinto but which is, nonetheless, not in solid water.

We claim:

1. In a planing inboard motor boat, a hull including a bow, a stern transom, a bottom having a lateral step located spacedly forward of the transom and in the after quarter of the hull, said bottom having a major portion forward of said step constituting the major planing support for the boat, the raised bottom portion of the hull aft of the step being out of water when the boat is operating at planing speeds in a straight ahead direction, a rudder and a rudder shaft located aft of said step and forward of said transom, said rudder comprising a streamlined lower steering portion and an upper attachment portion joined to said rudder shaft, said attachment portion being thicker than and shorter in its vertical dimension than said lower portion, said post extending upwardly from said attachment portion through said raised bottom portion adjacently rearward of said step with said attachment portion closely underlying said raised bottom portion behind said step, the height dimension of said step being at least substantially as great as the distance between said raised bottom portion and the lower parts of said attachment portion whereby the drag of said rudder shaft and attachment portion is minimized at planing speeds.

2. The combination according to claim 1 and a trim flap having a forward portion aligned and faired with and attached to said bottom forward of said step and an after portion extending aft of said step, and means behind said step and attached to said after portion for controlling said flap to adjust the longitudinal planing trim of said boat.

3. The combination according to claim 1 wherein said step is of "V" shape in plan and spaced further from said transom amidships than adjacent the outer ends of the step.

4. The combination according to claim 3 wherein the hull comprises chines meeting the transom, and the outer ends of the step meet the chines substantially at the respective intersections thereof with the transom.

5. The combination according to claim 4 wherein the stern portion of the bottom of the hull is of V shape characterized by a dead rise angle of between approximately 4° and 30°.

6. The combination according to claim 2 wherein the trim flap comprises two separate sections divided along the centerline of the hull, each of said section being provided with individually operable such controlling means, and said rudder being to one side of said centerline and matched to a second rudder similarly arranged on the other side of the centerline.

7. The combination according to claim 6 wherein said major portion of said hull bottom is of deep V shape characterized by a dead rise of between substantially 20 to 30°.

8. In a planing inboard motorboat, a hull including a bow, a stern transom, and a bottom, a lateral step located spacedly forward of the transom and in the afterquarter of the hull, said bottom having a major portion forward of said step constituting the major planing support for the boat, the raised bottom portion of the hull aft of the step being out of water when the boat is operating at planing speeds in a straight ahead direction, said step being of "V" shape in plan and spaced further from said transom amidships than adjacent the outer ends of the step, a respective trim flap disposed on each side of amidships, each said flap having a forward edge aligned and faired with and attached to said bottom forwardly of said step and an after portion extending aft of said step, and means disposed aft of said step and attached to said after portions for controlling said flaps to adjust the trim of said boat.

9. The combination according to claim 8 wherein said control means comprise a respective control rod for each flap extending and movable generally vertically through said bottom and wherein each said rod is provided with a respective attachment means joining the lower end of the rod to its respective said flap at the upper surface of the flap.

10. The combination according to claim 8 wherein said hull is provided with two propellers each disposed under and having its turning circle below the lower surface of a respective said flap.

11. The combination according to claim 8 wherein said major portion of the bottom of the hull is of deep V shape characterized by a dead rise angle of between substantially 20 and 30°.

12. In a planing inboard motor boat, a hull including a bow, a stern transom, and a bottom having a lateral step located spacedly forward of the transom and in the afterquarter of the hull, the said bottom having a major portion forward of said step constituting the major planing support for the boat, the raised bottom portion of the hull aft of the step being out of water when the boat is operating at planing speeds in a straight ahead direction, a trim flap having a forward edge portion aligned and faired with and swingably attached to said major portion of said bottom and an afterportion extending aft of said step, control means for trimming said flap, said hull being provided with a propeller shaft passing through said major portion of the hull bottom, a propeller on said shaft, a strut mounted to said raised bottom portion rearward of said flap and of said propeller, a bearing in said strut coaxial with said shaft, a journal in said bearing rigid with and coaxial with said shaft, said bearing providing shaft support rearwardly of said propeller.

13. The combination according to claim 11 wherein a rudder member is hingedly connected to said strut and extends aftwardly therefrom, said rudder being provided with a rudder shaft extending upwardly therefrom through said raised bottom portion and terminating inwardly of said hull, and steering means disposed inwardly of the hull for rotating said shaft.

14. The combination according to claim 8 wherein said raised bottom portion extends aft of the afteredges of said flaps.

* * * * *